HIGH COUNTING-RATE BASE LINE RESTORATION

Filed Oct. 3, 1967

*INVENTOR.*

ROBERT L. CHASE

*BY* LOUIS R. POULO

Roland A. Anderson

Attorney

United States Patent Office 3,501,708
Patented Mar. 17, 1970

3,501,708
HIGH COUNTING-RATE BASE LINE RESTORATION

Robert L. Chase, Blue Point, N.Y., and Louis R. Poulo, Watertown, Mass., assignors to the United States of America as represented by the United States Atomic Energy Commission Filed Oct. 3, 1967, Ser. No. 672,651
Int. Cl. H03f 21/00, 3/18, 3/10
U.S. Cl. 330—11 5 Claims

ABSTRACT OF THE DISCLOSURE

Electronic system for pulse analysis having precise means for preventing base line problems in Li (lithium) drifted Ge (germanium) pulse-amplitude spectrometers so as to provide high resolution in the detection and semiconductor radiation measurement of nuclear particles.

BACKGROUND OF THE INVENTION

The invention described herein was made in the course of, or under a contract with the U.S. Atomic Energy Commission.

In the field of high resolution pulse amplitude spectrometers for the detection and semiconductor radiation measurement of nuclear particles, a need exists for a high precision DC restorer for obtaining high resolution with Li (lithium)-drifted Ge (germanium) spectrometers over a wide range of counting rates. Since the counting rates have a range from a few thousand to over 50,000 pulses per second, resolution is often seriously degraded by base line problems the nature of which often depends on the pulse shaping mechanisms employed and the relative values of the pulse shaping and other interstage coupling time constants. Various means have been proposed and used to overcome these problems, comprising double-differentiation but the intrinsic signal-to-noise ratio is better for single differentiation. The ideal single-differentiated signal is a unipolar pulse returning monotonically to a stable baseline, and while it is possible to approach this ideal using pole-zero cancellation techniques described in Rev. Sci. Instr. 36, 1830–1839 (1965), in most systems in use today the so-called unipolar pulse is followed by at least one undershoot with an amplitude of from one-half to several percent of the pulse amplitude, decaying with a time constant between 50 microseconds and one millisecond. Thus, even when pole-zero is employed, the baseline between pulses is depressed by an amount which depends on the duty cycle and which fluctuates with statistical and systematic variations in the counting rate.

It is an object of this invention, therefore, to overcome the heretofore known base line problems by providing a high precision DC restorer;

It is another object substantially to reduce base line problems by precise means that can generally be applied either to single or double differentiation for positive going or negative going pulses;

It is another object to provide a precise DC restorer that makes it possible to obtain high resolution with Li-drifted Ge spectrometers at counting rates above and below 50,000 per second;

It is still another object to provide a double-diode restorer with precise low parasitic oscillation circuitry for enhancing the performance thereof for duty cycles approaching 10%.

SUMMARY OF THE INVENTION

This invention provides high counting-rate base line restoration with a high precision, low parasitic oscillation, double diode restorer in series with a feed back loop. More specifically, a forward biased double diode restorer carrying separate currents is provided with low parasitic oscillations in a particular operational amplifier having a feed back loop that decreases effective dynamic resistance by a factor equal to the amplifier gain and without increasing the diode currents. Quiescently, both diodes conduct equal currents, the input and output potentials of the operational amplifier are near zero and with the proper selection of high amplifier gain and components, as described in more detail hereinafter, a low parasitic oscillation system is provided wherein a very small input signal produces enough output to switch all the current to one diode so that constant current charging continues until the input returns very close to zero potential.

The above and further objects and novel features will become apparent from the following detailed description when the same is read in connection with the accompanying drawings. It is to be expressly understood, however, that the drawings are not intended as a definition of the invention but are for the purpose of illustration only.

BRIEF DESCRIPTION OF THE DRAWING

In the drawings, where like elements are referenced alike.

DESCRIPTION OF THE PREFERRED EMBODIMENTS

Figures 1A, 1B, 2:
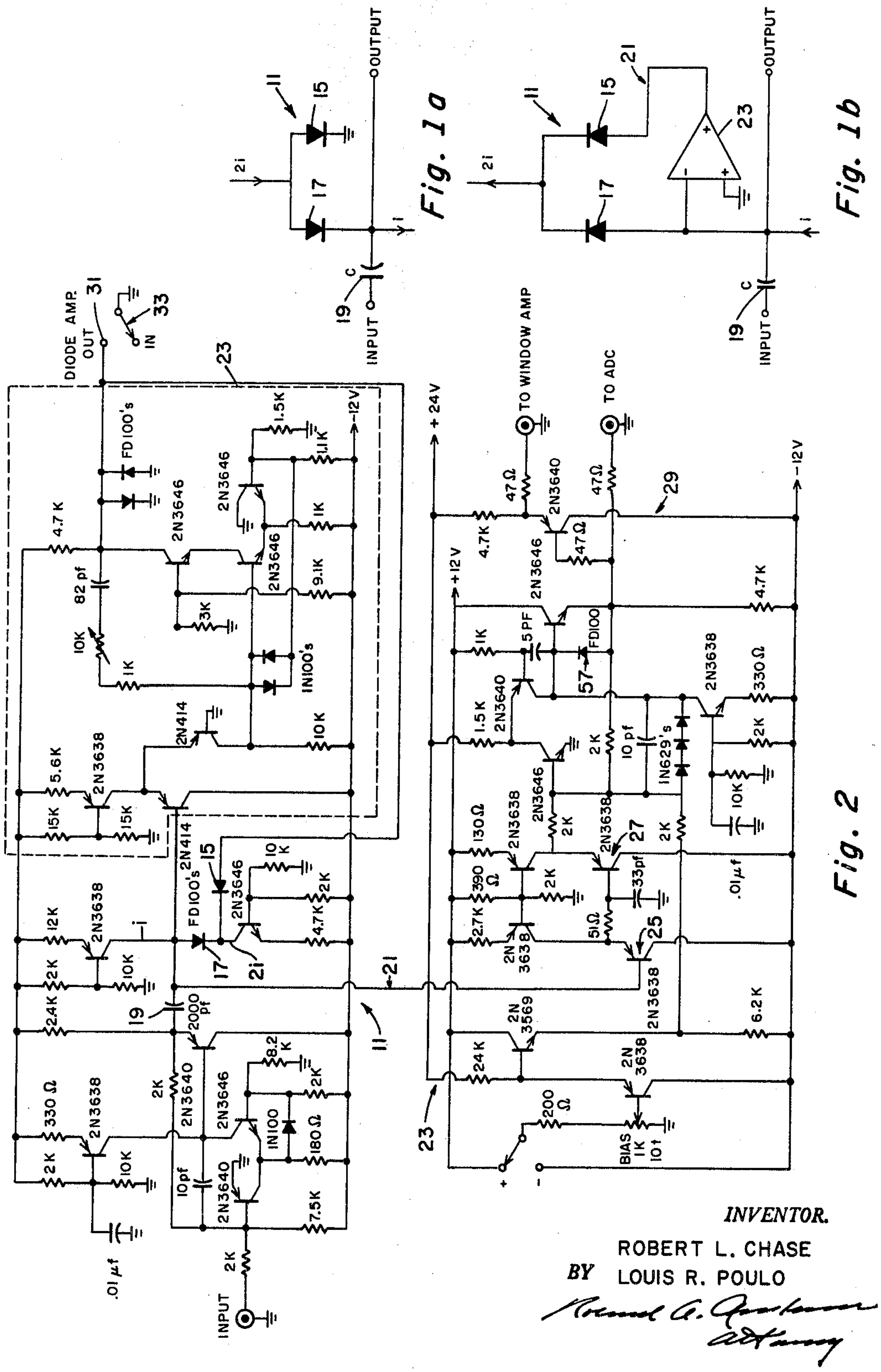
FIG. 1*a* is a partial schematic diagram of a double-diode DC restorer.
FIG. 1*b* is a partial schematic diagram of an amplified diode DC restorer.
FIG. 2 is a partial circuit diagram of the amplified diode DC restorer of FIG. 1*b* with input and output buffer amplifiers.

It is known that nuclear charged particles or gamma rays can be detected with Li drifted semiconductors in which the particle or rays produce pulses whose amplitudes or full energy lines correspond to the charged particle or gamma ray energy. Li drifted semiconductors are described in U.S. Patent 3,272,668.

The problem with base line shift in the case of high counting rates is discussed in U.S. patent application S.N. 593,599, filed Nov. 9, 1966, by P. A. Thieberger, and the use of DC restorers to avoid this problem is discussed in Rev. Sci. Instr., 32, 1057 (1961). The system of this invention is, in effect a variation of the DC restorer described in this reference, which is shown in FIG. 1*a* herein.

Referring to FIG 1*a*, a DC restorer 11 is shown. Quiescently, both diodes 15 and 17 are forward biased, each carrying current *i*. Input signals, of either polarity, greater than a few hundred millivolts cut off one diode, leaving a charging current *i* flowing from the coupling capacitor 19. Between signals the charge leaks off through the low forward resistance of the two diodes in series, leaving only a small residual baseline shift even at high counting rates. The offset voltage $V_o$, is derived from the duty ratio, $f$, the incremental diode resistance, $r$, and the quiescent diodes current, $i$ and $fi=(1-f)V_o/2r$ (1).

The diode resistance can be written $r=K/i$ (2) where, for semiconductor diodes at currents large compared to the reverse saturation current, K has a value between 25 and $50\times10^{-3}$. Substituting (2) in (1), we obtain $$V_o=\frac{2Kf}{1-f}$$

which is seen to be independent of $i$ and to have a value between 5 and 10 millivolts at a 10% duty cycle. This analysis is based on the assumption that the source impedance is low compared with the diode incremental resistance, $r$, the analyzer input impedance is high, and the time constant, $rC$, is large compared to the average interval between pulses.

If on the other hand, C is made small so that $rC$ is short compared to the average interval between pulses, then, instead of correcting for average base line shifts, the circuit restores the baseline shortly after each pulse. The effect on an ideal square pulse when C is chosen so that $i$ produces a significant droop during the pulse is illustrative. The recovery time with ideal diodes is equal to the pulse width, and with real diodes is somewhat longer. The effect on a square pulse followed by a small undershoot of long duration is that the recovery time is related to the droop and the amplitude of the undershoot. The effect on a double-differentiated signal with a secondary overshoot is similar with like undershoot and overshoot. In both cases the undershoot or overshoot can be quickly removed by a restorer if the undershoot or overshoot is not too large to begin with, if some droop is acceptable and if the diode resistance is low. The restorer in effect establishes a minimum rate, determined by i and C, at which a signal returns to the baseline so that, in addition to removing undershoots, it can significantly reduce the duration of tails following ideal RC shaped signals. However, at duty cycles approaching 10% the performance of the double-diode restorer becomes significantly degraded because of finite diode incremental resistance, and it becomes worthwhile to introduce circuitry to decrease this resistance.

In accordance with the circuitry illustrated in FIG. 1*b*, therefore, the diodes 15 and 17 are included in an operational amplifier feedback loop 21 that decreases their effective dynamic resistance by a factor equal to the amplifier gain, without increasing the diode current. quiesently, both diodes 15 and 17 conduct equal currents, and the input and output potentials of the operational amplifier 23 are near zero. If the amplifier has high gain, a very small input signal produces enough output to switch all the current to one diode so that constant current charging continues until the input returns very close to zero potential. The amplifier output swing is limited to just that necessary to switch the feedback diodes in order to eliminate any delay in closing the loop associated with the charging time of output stray capacitance. Also, its differential input impedance must be high so as not to load the input capacitor after the diodes have switched.

A complete practical DC restoring system is shown in FIG. 2. It comprises a unity gain input amplifier with very low output impedance (less than 1 ohm), a 2000 pf. coupling capacitor 19, operational amplifier 23, diode restorer 11, a pair of cascaded emitter followers 25 and 27 with constant current loads to minimize the capacitor loading, and a DC-coupled unity gain output buffer amplifier 29. To be effective, the output must be DC-coupled to a pulse height analyzer analogue-to-digital converter. This can be accomplished by a minor modification to the input circuitry of commercial pulse height analyzers. Alternately, the output buffer amplifier 29 can be operated as a subtractor, and can be DC-coupled (with slight modifications) into commercial window amplifiers such as the Ortec Model 408 or Sturrup Model 1460. Baseline problems following the window amplifier are reduced in proportion to the amplifier gain so that conventional AC-coupling into the pulse height analyzer may be satisfactory even at high rates, particularly if the analyzer includes a double diode restorer at its input.

In operation, the amplified restorer 11 of FIG. 2 can be used with a Tennelec Model TC200 linear amplifier, operated single clipped, with rise and fall time constants of 1.6 microseconds, driven from a low frequency square wave generator simulating a step input signal with definite decay time. It is observed that, because of finite interstage coupling time constants, a 5 volt output signal is followed by a 20 mv. undershoot that takes several milliseconds to decay. The ouput of the restorer 11 has a somewhat larger undershoot because of the droop (100 mv. per microsecond) introduced by the diode current (200 $\mu$A.) in the 2000 pf. coupling capacitor, but the undershoot decays linearly and, after a small transient as the diode operational amplifier 23 switches on, settles quickly to within 1 mv. of the undisturbed baseline.

The performance of the circuit of FIG. 2, can be evaluated using a lithium-drifted germanium detector, a field effect preamplifier with a decay time constant of 50 microseconds, an Ortec Model 220 linear amplifier operated double-clipped with 2 microsecond rise and fall time constants, and a Victoreen Model Scipp 1600 pulse height analyzer having a short circuit 0.1 $\mu$f. capacitor driving a double diode restorer in the input circuit of the analyzer. With the amplified restorer 11 of FIG. 2, a $Co^{60}$ source, and a counting rate of about 30,000 per second, the full energy lines can be observed with resolution comparable to that observed at low counting rates. Without the amplified restorer 11 on the other hand, the full energy lines are badly washed out. Without the amplified restorer 11 and with single clipping, the full energy lines are not observed.

Also, a somewhat less than perfect restorer 11, without a diode amplifier attached to output 31, averages the baseline noise over a time comparable to the time constant determined by the coupling capacitor and the diode resistance (several microseconds with the values illustrated in FIG. 2), and results in scarcely discernible line broadening. The system 11, therefore, has a switch 33 with which the diode operational amplifier 23 can be removed when working at low and moderate counting rates.

The values shown in FIG. 2 additionally avoid parasitic oscillations, which sometimes occur with models built in accordance with an early model described in BNL10649, which was published on or about Nov. 18, 1966. Also, with the transistor values illustrated in FIG. 2, the connections on the appropriate transistors can be reversed so that the system of this invention can be used for negative going signals. To this end the appropriate elements, i.e. elements 15, 17 and 57, and the transistors labelled IN100 and FD100, are reversed for negative going signals at the input.

This invention has the advantage of providing precise, high resolution, pulse amplitude spectrometry in a spectrometer having a pair of diodes in a double-diode, direct current, low parasitic oscillation, base line restorer circuit for high counting rates. The system of this invention, for example, provides full energy line measurements with Li drifted Ge pulse amplitude gamma ray spectrometers up to from 30,000 to over 50,000 counts per second in a system having a high-gain, high differential-input impedance, low output impedance operational amplifier in series with a pair of diodes in an operational feedback loop that reduces the effective dynamic resistance of the pair of diodes without increasing the diode current.

What is claimed is:

1. In apparatus for high resolution pulse amplitude spectrometry of the type having a pair of diodes in a double-diode direct current base line restorer for input signals from solid state radiation detectors, the improvement, comprising a high gain, high differential-input impedance, low output impedance amplifier connected to one of said diodes in a feedback loop for reducing the dynamic resistance of said diodes presented to said input signals transmitted to said restorer without increasing the current in said diodes, and low parasitic oscillation means responsive to said amplifier and said input signals for transmitting output signals corresponding to said input signals for said pulse amplitude spectrometry.

2. The invention of claim 1 having a switch for removing the operational amplifier for operation at low counting rates.

3. The invention of claim 1 having low parasitic oscillations whereby the same value components can be used for receiving positive going and negative going input pulses.

4. The invention of claim 1 in which said high gain amplifier has a unity gain amplifier having a 200 pf. coupling capacitor for receiving said input signals and transmitting them to said high gain amplifier, and a pair of cascaded emitter followers with constant current loads for minimizing the capacitor loading, and a DC coupled unity gain output buffer amplifier in said low parasitic oscillation means for DC-coupling of said high gain amplifier and said capacitor into a window amplifier for providing said pulse amplitude spectrometry.

5. The invention of claim 1 wherein the operational feedback loop decreases the effective dynamic resistance of said diodes by a factor equal to the gain of said operational amplifier gain so as to prevent the increase in the currents of said diodes.

References Cited

UNITED STATES PATENTS

| | | | |
|---|---|---|---|
| 2,792,496 | 5/1957 | Rhodes | 328—226 |
| 3,058,068 | 10/1962 | Hinrichs et al. | 330—10 |
| 3,268,830 | 8/1966 | Ragsdale | 330—110 |

NATHAN KAUFMAN, Primary Examiner

U.S. Cl. X.R.

178—7.1; 330—18, 20, 24